J. B. MOUTIER.
AIR-FORCING BEER-PUMPS.

No. 195,834. Patented Oct. 2, 1877.

UNITED STATES PATENT OFFICE.

JOHN B. MOUTIER, OF CRUGER, ILLINOIS, ASSIGNOR TO PETER NAFZIGER, OF SAME PLACE.

IMPROVEMENT IN AIR-FORCING BEER-PUMPS.

Specification forming part of Letters Patent No. 195,834, dated October 2, 1877; application filed August 29, 1877.

*To all whom it may concern:*

Be it known that I, JOHN B. MOUTIER, of the village of Cruger, in the county of Woodford, in the State of Illinois, have invented an Improvement in Beer-Pump and Air-Injector; and do hereby declare that the following is a full, clear, and exact description thereof, reference being had to the annexed drawings, making a part of this specification, in which like letters of reference refer to like parts, and in which—

Figure 1:
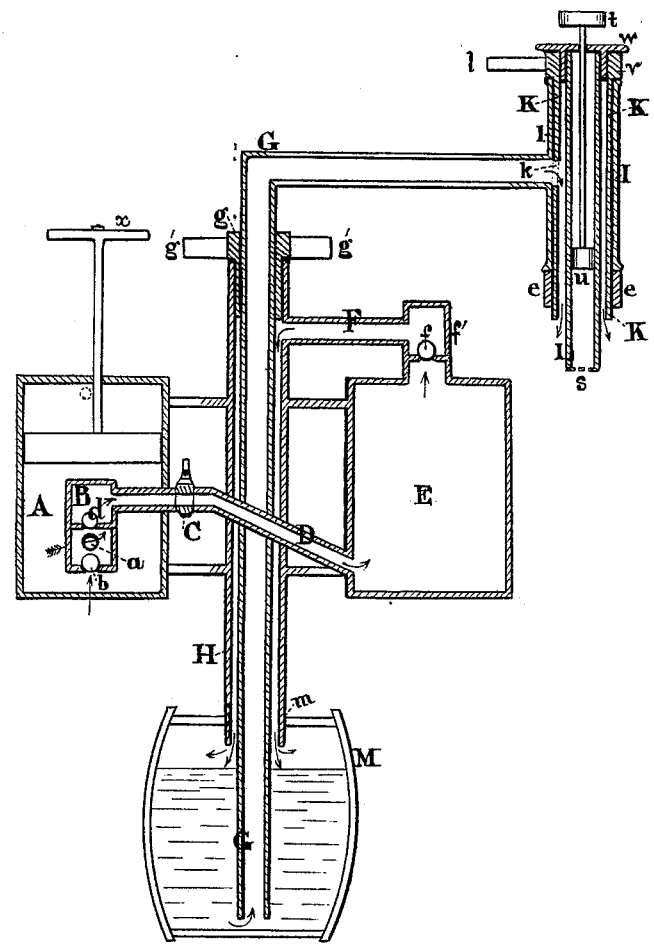
Figure 2:
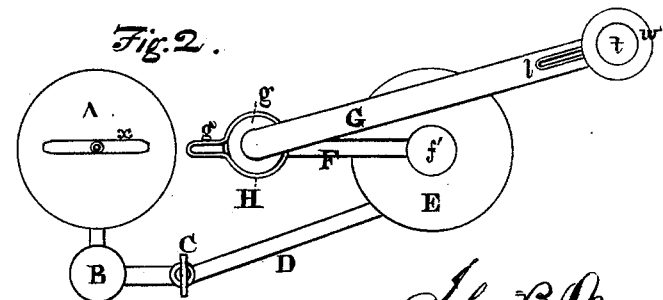

Figure 1 represents a vertical ideal section of pump or injector and beer-vessel; Fig. 2, a plan of same.

In this invention the draft or beer pipe, which goes to the bottom of the beer-vessel, passes through an inclosing pipe, which is screwed into the beer vessel, keg, barrel, &c., which is the channel by which air is forced, by means of an air-pump, into said vessel, a space being provided between said pipes for that purpose, which is closed above the duct from the air-pump by a screw-collar or packing between the pipes, so as to allow no air to pass upward. Through this space, between the pipes, air is forced into the upper part of the beer-vessel, to keep the beer under great pressure, to maintain its vitality, and to cause it to flow upward through a pipe, or outward through the tap or faucet when a draft is required.

The pressure requires to be renewed occasionally by means of an attached air-pump.

The terminal faucet may be composed of three tubes, one within the other, the outer one being the sheath or case, the next one within being the faucet-tube, and made with a packing or tight connection to the inner surface of its sheath, but allowing it to turn readily, to bring the hole or beer-passage into action.

Within the faucet-tube may be placed an air-injector or "frother," to throw air into the escaping beer when the faucet is turned on. This is a tube with piston and perforated lower end extending into the stream of beer which escapes from bottom of faucet, which tube occupies the center of said faucet-tube, being secured to the upper end of the latter by means of cap and screw, or means known to the art.

One of the forms in which I construct this beer-pump or air-injector is as follows: A short pipe, H, is screwed into the head of the beer-vessel M. Through this passes a smaller pipe, G, (leaving a space between the two,) which extends to the bottom of said vessel, and in the opposite direction to the point where the beer is desired to be drawn off, or the faucet K I L. The two pipes are united by a screw-collar, *g*, at top of pipe H, after the latter is screwed into the barrel M.

A represents an air-pump or cylinder and piston, having a passage, *a*, into the valve-chamber B, to receive air at its bottom at the valve *b*, and pass it through the upper valve *d* in same chamber, past the stop-cock C, into the duct D and air-chamber E, whence it proceeds past valve *f*, through duct F, into said injecting-pipe H, and thence into the vessel M upon the beer.

The air-chamber E maintains an elastic pressure on the beer after the cock C is closed, and also preserves the life of the beer, as well as forcing it powerfully up the pipe G. The draft-pipe H ends in a faucet or compound faucet, with the outer sheath I, in which the faucet proper K turns, by means of handle *l* at its top, to bring its opening *k* opposite to the opening in pipe G. A screw-collar, *e*, fits against the lower part of said faucet, and against the lower edge of its sheath I, to make a tight joint at this place.

L is a tube within the faucet K, of much smaller caliber, to enable the beer to pass downward between the two. It extends below the lower end of said faucet, and is secured in the upper end of the same by means of a thread or screw-collar or cap, *w*. The latter, *w*, is pierced to admit a rod and piston, *u*, for the purpose of injecting air down the tube L, through its perforated nozzle *s*, into the stream of beer, when the faucet is turned on, for the purpose of frothing the beer.

The operation of this pump is as follows: Air is forced, by means of pump A, pipe D, air-chamber E, pipe F, into the sheath-pipe H, which incloses the beer-pipe G, until the chamber E is highly charged with air, to form or keep up for many hours a pressure upon the beer in the vessel M sufficient to expel the same without other means, and at the same time to preserve the life or spirit of the liquor. The faucet-handle *l* brings the opening *k* therein opposite to the adjoining end of pipe G, and the beer flows down between the faucet K and the frothing-tube L. The latter is used to inject air into the flowing stream through the perforations *s* in the bottom of said frother L. The stop-cock C is turned shut when the receiver E is charged, for the purpose of retaining the pressure of the air upon the beer in the vessel.

Beer may be forced from the cellar to any reasonable distance from the latter, as into a room above it, &c.

What I claim as my invention is—

1. The combination, with beer-vessel M, of pipes H G F, air-chamber E, duct D, having cock C, and air-pump A B, or air-injector, adapted to force beer up the pipe G, and faucet I K L, or stop-cock, substantially as described.

2. The draft-pipe G, air-pipe H, branch pipe F to lateral air-chamber E, connected by pipe D and cock C with air-pump A or air-injector, substantially as arranged, and for the purposes described.

3. The arrangement of the air-injector A on one side of and attached to the main or central pipe, to balance the lateral air-chamber E on the opposite side of said pipe, attached in like manner to said central or main pipes by means of arms or braces, so as to make the whole apparatus A E H G easily handled and readily portable in one piece, substantially as and for the purposes described.

4. The combination, in a beer-pump, of a central draft-pipe, G, and faucet, air-injecting pipe H F and lateral air-chamber E on one side, and of air-pump A on the other side, braced together upon said central pipe for convenience, and of unification of the parts, as described.

5. The combination, with beer-vessel M, of pipes H G F, air-chamber E, duct D, cock C, valve-chamber B, and air-pump A, adapted to force beer from the faucet I K L, and in combination with the latter, operated substantially as described.

In testimony that I claim the foregoing beer-pump or air-injector I have hereunto set my hand this 23d day of August, A. D. 1877.

JOHN B. MOUTIER.

Witnesses:
MAISH H. WILLIAMSON,
LYNDHURST THURLOW.